(12) United States Patent
Lanteires et al.

(10) Patent No.: US 7,881,854 B2
(45) Date of Patent: Feb. 1, 2011

(54) METHOD OF REDUCING HYDROCARBON EMISSIONS FROM A COLD ENGINE AND DEVICE AND ENGINE FOR CARRYING OUT THIS METHOD

(75) Inventors: Fabien Lanteires, Puteaux (FR); Raphael Penet, Paris (FR)

(73) Assignee: Peugeot Citroen Automobiles SA, Velizy Vilacoublay (FR)

( * ) Notice: Subject to any disclaimer, the term of this patent is extended or adjusted under 35 U.S.C. 154(b) by 753 days.

(21) Appl. No.: 11/918,965

(22) PCT Filed: Apr. 5, 2006

(86) PCT No.: PCT/FR2006/050303
§ 371 (c)(1),
(2), (4) Date: Oct. 22, 2007

(87) PCT Pub. No.: WO2006/117486
PCT Pub. Date: Nov. 9, 2006

(65) Prior Publication Data
US 2009/0050085 A1    Feb. 26, 2009

(30) Foreign Application Priority Data
May 3, 2005    (FR) .................................. 05 04507

(51) Int. Cl.
*F02D 13/02*    (2006.01)
*F02D 41/06*    (2006.01)
*F01L 1/34*    (2006.01)
*G06F 19/00*    (2006.01)

(52) U.S. Cl. .................. 701/103; 123/90.11; 123/90.15; 123/478; 701/105

(58) Field of Classification Search ............. 123/90.11, 123/90.15–90.18, 347, 348, 478, 480; 701/101–105, 701/110, 113, 115; 60/274, 285
See application file for complete search history.

(56) References Cited

U.S. PATENT DOCUMENTS

| | | | |
|---|---|---|---|
| 5,992,361 A * | 11/1999 | Murata et al. ............ | 123/90.17 |
| 6,182,621 B1 | 2/2001 | Salber et al. | |
| 6,311,653 B1 | 11/2001 | Hamamoto | |
| 6,659,054 B2 * | 12/2003 | Sugiyama et al. ........ | 123/90.16 |
| 7,121,238 B2 * | 10/2006 | Minami et al. ........... | 123/90.15 |
| 7,685,994 B2 * | 3/2010 | Mashiki et al. ............ | 123/347 |
| 7,712,439 B2 * | 5/2010 | Lanteires ................. | 123/90.15 |
| 2002/0134348 A1 | 9/2002 | Salber et al. | |
| 2003/0164163 A1 | 9/2003 | Lei et al. | |
| 2004/0118367 A1 | 6/2004 | Ezaki et al. | |
| 2004/0154568 A1 * | 8/2004 | Yamauchi et al. ........ | 123/90.17 |

FOREIGN PATENT DOCUMENTS

EP    1 426 567 A    6/2004
EP    1 457 645 A    9/2004

* cited by examiner

*Primary Examiner*—Willis R Wolfe, Jr.
(74) *Attorney, Agent, or Firm*—Nicolas E. Seckel

(57) ABSTRACT

The invention relates to a method of control of an internal combustion engine comprising at least one electrically controlled inlet valve.

To reduce hydrocarbon emissions by the cold engine, the opening of the valve is controlled in two successive phases (32, 34), the first phase (32) corresponding principally with the admission of fuel and the second phase (34) mainly corresponding with the air inlet. The opening of the valve is substantially lower during the first phase than during the second phase in order to pulverize the fuel into fine droplets during the first phase.

14 Claims, 2 Drawing Sheets

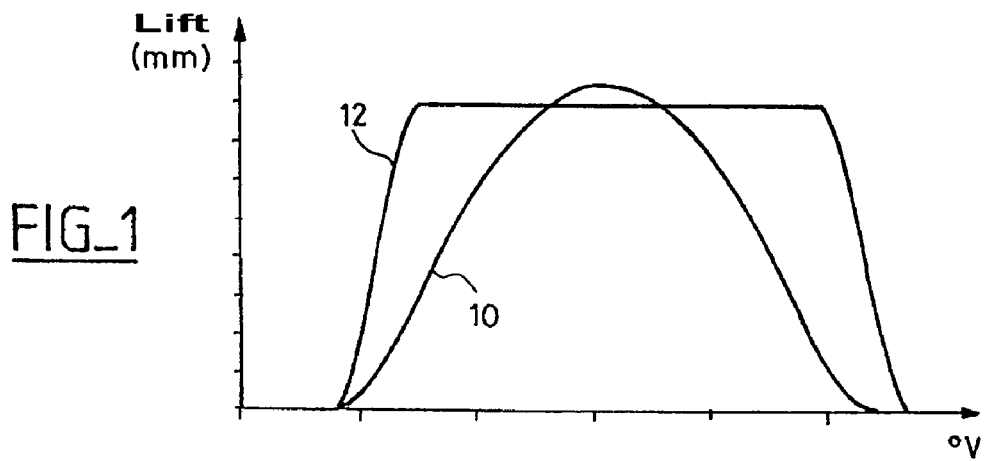
FIG_1
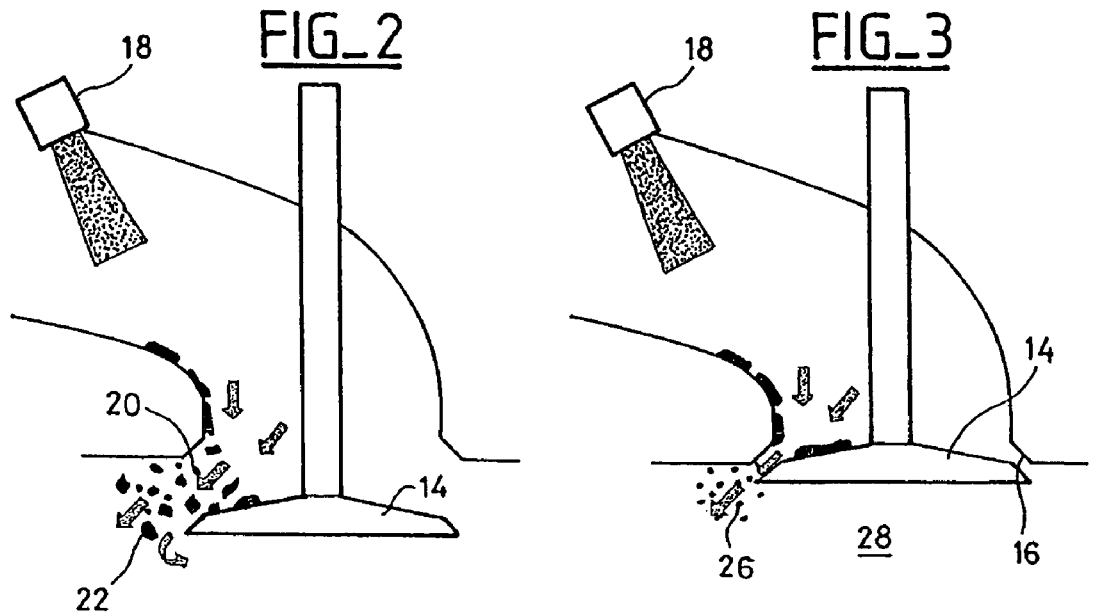
FIG_2  FIG_3
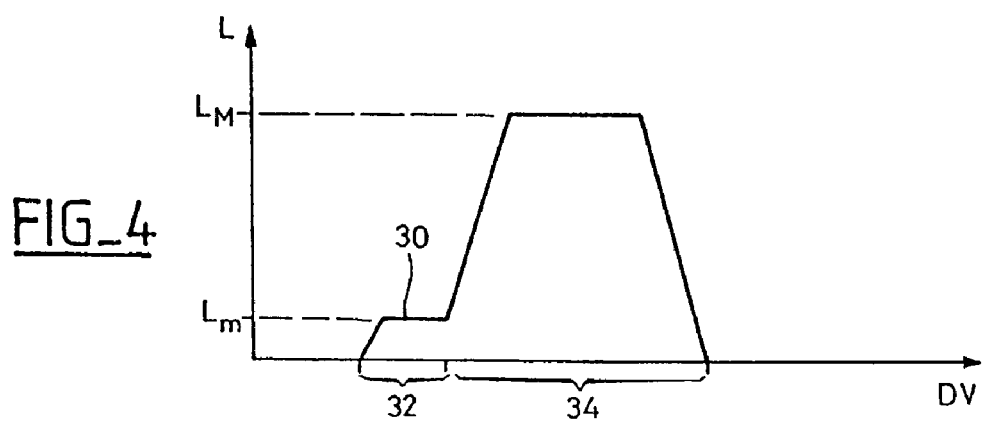
FIG_4

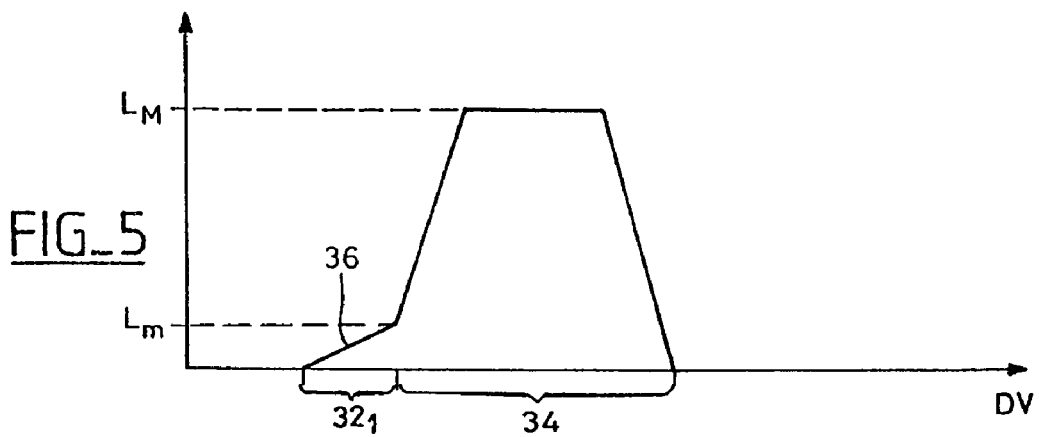
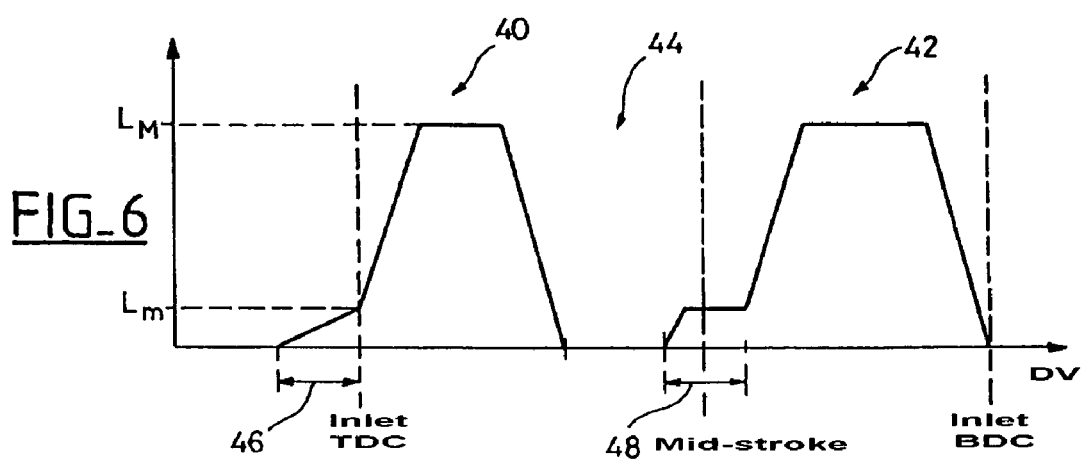
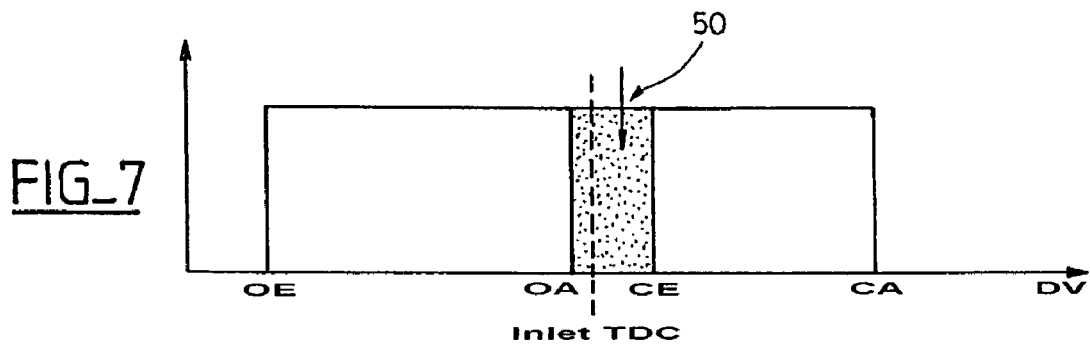

METHOD OF REDUCING HYDROCARBON EMISSIONS FROM A COLD ENGINE AND DEVICE AND ENGINE FOR CARRYING OUT THIS METHOD

This application is a §371 from PCT/FR2006/050303 filed Apr. 5, 2006, which claims priority from FR 05 04507 filed May 3, 2005, each of which is herein incorporated by reference in its entirety.

BACKGROUND

The invention relates to a method of reducing hydrocarbon emissions from a cold engine. It also concerns a device for implementing this method and an internal combustion engine which calls upon said method and/or the device.

Environmental pollution caused by internal combustion engines represents a concern which has led the authorities to put in place standards which must, or should, be respected by automobile manufacturers. In particular, the level of hydrocarbons released into the atmosphere must be considerably reduced.

To this effect, it is known, in one part, to call upon catalysis for improving the combustion of exhaust gases of internal combustion engines and, in another part to improve the combustion in internal combustion engines.

The greater part of hydrocarbon emissions occur when the engine is cold, that is to say generally on start up, since, in this situation, catalysers are not activated, the quality of the air and fuel mix and the thermodynamic conditions in the cylinder are not optimised and, thereby, combustion is not properly carried out.

SUMMARY OF THE INVENTION

It has been noted that hydrocarbon emissions, when an engine is cold, are greater in the case where the motor uses valves of an electrically controlled type, particularly electromagnetic or electrohydraulic, whereas they are less in the case where the valves are controlled in a classic way by a camshaft.

Based on this observation, the inventors have discovered that the greater hydrocarbon emission of a cold engine in the case of electrically controlled valves derives in part from the fact that the opening of the inlet valve works more rapidly with such an electrical control than with a classic control by camshaft. The diagram in FIG. 1 illustrates this difference in behavior. On this diagram, the abscissa represents the crankshaft angle (or the time) and the ordinance represents the valve lift in millimetres, that is to say the distance of the valve from its seat.

Curve 10 corresponds with a classic cramshaft controlled valve and curve 12 corresponds with an electrically controlled valve.

In order to properly understand the behavioral difference between the two controlling types, it is herewith noted that the fuel is injected on the valve before its opening; in consequence, in the case of a progressive opening (curve 10), the fuel is introduced into the engine cylinder while the valve lift is still low. This introduction of fuel at low lift brings about a pulverization into fine droplets of this fuel which is introduced into the cylinder and, consequently, a better combustion.

Conversely, when the opening section is bigger at the beginning of this opening phase of the valve (curve 12), the speed of introduction of the air-fuel mix is substantially lower and in consequence the pulverisation of the fuel is much less fine, which brings about an inferior combustion in the engine cylinder. These different situations are illustrated by FIGS. 2 and 3.

FIG. 2 corresponds with a rapid opening (curve 12) of the injection valve 14, whereas FIG. 3 corresponds with a slower opening of this valve 14 (curve 10).

In both cases, the injection valve 14 is closed, that is to say in contact with its seat 16, when the fuel is sent to the back face of the valve 14 using an injector 18.

When the valve 14 opens rapidly (FIG. 2), the large section of passage left to the fuel brings about a relatively low pulling speed by the air and therefore the formation of droplets 22 of large dimensions. Conversely, when the section of the passage is smaller, the pulling speed by the air is greater and the pulverization much more effective, the droplets 26 introduced into the cylinder 28 being therefore of much smaller dimension than in the case of FIG. 2.

It can be observed that in general, with an electric control, the time of the valve lift is independent to the engine's speed. The result is that, in comparison with the duration of an engine cycle, the time required for the valve to reach its maximum lift is relatively less at low speed than at high speed, which increases by as much the emission of unburnt hydrocarbons when the engine is at low speed.

Thus, the invention concerns a method of reducing hydrocarbon emissions by a cold internal combustion engine with electrically controlled inlet valves which is characterised in that the opening of the valve is controlled in two phases, a first phase principally for the inlet of fuel and a second phase principally for the admission of air, the opening of the valve being noticeably smaller during the first phase than during the second phase, so that the fuel is pulverized into fine droplets during this first phase.

In these conditions, the functioning of the engine with electrically controlled valves is analogous to that of the engine controlled by a camshaft at the start of the valve opening, that is to say that the functioning corresponds to that which is represented on FIG. 3.

The first phase, of short lift, is carried out by example in the form of a threshold, the valve opening rapidly to reach the first lift value and staying at this first, relatively low, value during the rest of the first phase.

In one variation, during the first phase the increase in the valve lift is progressive.

The invention also applies in the case where the same inlet valve opens twice during the engine inlet phase, that is to say with a pilot lift and a main lift, these two lifts being separated by a step for closing the valve.

Thus, the valve (or the valves) is (are) closed when the piston is in the descending phase, which creates a depression in the cylinder. In these conditions, at the moment of the second opening (main lift), the gas turbulence inside the chamber is increased. This level of turbulence is optimised if the opening of the valve has taken place substantially at the mid-stroke of the piston, that is to say when the speed of the piston is at a maximum.

In the case of such a double lift, provision is made for an initial short lift phase, both for the pilot lift and for the main lift. The short lift at the beginning of the main lift furthermore presents the advantage of increasing the gas turbulence in the chamber.

The increase in turbulence in the cylinder permits the reduction of the ignition advance and thus delays the combustion during the functioning cycle of the engine. This means that the exhaust gases are hotter, which accelerates the heating up of the catalyser and therefore the elimination of hydrocarbons.

Thus, in one embodiment, in comparison to a hot engine, during the second opening (42), the combustion in the cycle is delayed in order to evacuate hotter gases which are then sent to a catalytic combustion system.

In one embodiment, the fuel admission is carried out both during the pilot lift and the main lift.

In another embodiment, the pilot lift happens when the exhaust valves are still open. In this case, the pilot lift of the inlet valve(s) permits the flowing-back of exhaust gases into the inlet duct.

In this situation, the low amplitude lift at the beginning of the pilot lift is designed to limit the quantity of exhaust gas trapped in the cylinder and to control this quantity, which is to say to limit its variation according to time.

Thus, in this embodiment, of double lift and low amplitude lift at the start of each lift, an optimal combustion and a faster activation of the catalyser(s) is obtained during the second lift (main lift). Furthermore, with the low amplitude lift at the start of the pilot lift, as indicated above, the suction back into the cylinder of part of the unburnt hydrocarbons, which are then burnt during the following cycle, is well controlled.

Alternatively, provision is made for the low amplitude lift only for the main lift. When the recirculation of burnt gases is carried out by exhaust displacement, the closing of exhaust valves happens after the top dead center (TDC) of the inlet, it is not necessary to control the quantity of gas burnt using a low amplitude lift of the pilot lift.

Alternatively, provision is made for two inlet valves per cylinder and one valve is used for carrying out the pilot lift and the second is used for carrying out the main lift.

However, in the case where provision has been made for two inlet valves, the action of these two valves can be synchronised, that is to say that the two valves can both be used for the pilot lift and for the main lift.

The invention also concerns a device for the implementation of the method defined above which comprises the means to control the valves to perform the openings and at least one catalytic system for the combustion of burnt exhaust gases.

The invention also covers an engine equipped with such a vehicle.

BRIEF DESCRIPTION OF THE DRAWINGS

Other characteristics and advantages of the invention will appear with the description of some of its embodiments; these being carried out by reference to the drawings hereby annexed, on which:

FIG. 1, already described, is a diagram showing the variation of an inlet valve lift for a valve controlled by a camshaft and for a valve controlled in a classic way by electronic control;

FIGS. 2 and 3, already described, are schemas illustrating the injection and the opening of the valve;

FIGS. 4, 5 and 6 are diagrams illustrating the opening controls of the valve according to several embodiments of the invention; and FIG. 7 is a diagram illustrating the control of exhaust and inlet valves.

DETAILED DESCRIPTION OF THE EMBODIMENTS

The embodiment of the invention that will be described in reference to the drawings relates to an engine of four stroke type with electromagnetically controlled valves, particularly biased electromagnetic. However, a "flexible" type valve driver also comes into the scope of the invention, particularly by all electric controls.

The type of the petrol engine is of no particular type, that is to say it is either supercharged or not, injection or not. The architecture of the engine is also of no particular type. It can either be straight, V or flat.

The valve control according to the invention relates to measures for reducing polluting hydrocarbon emissions when the engine is cold, that is to say when a catalytic device (not shown) is not yet activated.

To maximise the combustion of hydrocarbons, provision is made for a start of an opening phase of an inlet valve with a valve lift (that is to say a degree of opening) which is clearly inferior to the subsequent valve lift occurring during the admission in a same cycle. Thus, as shown in FIG. 4 which is a diagram showing the degrees of the crankshaft on the abscissa (CD) and the values of the valve lift in the ordinance, during a first phase 32 the valve lift presents a value $L_m$ substantially lower to the value $L_M$ during the second phase 34 of the complete opening of the valve.

In the example represented on the diagram in FIG. 4, the first phase consists of conferring the lift $L_m$ according to a threshold 30, that is to say that the lift $L_m$ is practically constant during phase 32.

The first phase of opening corresponds for example to a valve lift comprised between 0.1 and 1 mm and the time 32 is from 1 to 4 ms.

It is noted that the first phase 32 permits the pulverization of fuel deposited on the inlet duct and the valve whereas during the second phase 34, the maximum lift permits the filling of the cylinder with air.

In the variation represented on FIG. 5, the first phase 32, of the valve lift is of a ramp type, that is to say that the lift $L_m$ is reached at the end of the period $32_1$, the variation 36 of the lift being even during this first phase $32_1$. In this example, the first phase of the lift stretches over a time also included between 1 and 4 ms and at the end of the first phase $32_1$ the opening or lift is comprised between 0.5 and 1 mm.

The diagram on FIG. 6 refers to the case where the inlet valve opens twice during the inlet phase of the engine. The first lift 40 is a lift referred to as the pilot and second lift 42 is a lift referred to as the main. Between these two lifts, the inlet valve is closed, which corresponds with zone 44 on the diagram in FIG. 6.

The pilot lift and the main lift each comprise a first phase during the opening of the valve is reduced.

During the course of the pilot lift 40, the reduced lift happens during a first phase 46 before the top dead center (TDC) of the inlet.

During the course of the main lift 42, the reduced lift 48 happens around the mid-stroke of the piston, and the closure of the valve happens at the bottom dead center (BDC) of inlet.

More precisely, phase 46 begins between 60 DV and 0 DV before the top dead center, whereas the end of phase 46 occurs between 0 DV and 30 DV after the top dead centre of the inlet.

In the case where the end of the exhaust occurs at the beginning of the admission, as is represented on FIG. 7, the phase 46 of low opening of the inlet valve permits the limitation of the quantity of flow-back gas (exhaust) trapped in the cylinder and makes this quantity substantially constant.

In the diagram represented on FIG. 7, which represents the valve lifts according to the crankshaft degree, OE means the opening of the exhaust, CE means the closing of the exhaust, OA means the opening of the inlet and CA means the closing of the inlet. Thereby a "cross-over" zone 50 exists during which the inlet valves and the exhaust are simultaneously open.

The closure 44 of the inlet valve between the pilot lift and the main lift creates a depression in the cylinder when the valves are all closed and when the piston is in a descending phase. In these conditions, at the start of the main lift, a movement of gases is created which increases turbulence in the cylinder. This turbulence is maximised if the opening of the valve has taken place at around the mid-stroke position of the piston, that is to say when the speed of the piston is at maximum.

The start of phase 48 (low lift at the start of the main lift) occurs between 30 DV and 0 DV before the mid-stroke. The end of this period 48 of minimum lift happens between 0 and 30 DV after the mid-stroke of the piston.

As referred to above, a low lift brings about a gas speed through the valve which is greater than when the lift is at maximum. Furthermore, as in the case of a single lift, the pulverization of fuel is greater which permits the optimisation for the preparation of the air-fuel mix, that is to say, reduces the size of the droplets.

In these conditions, because of the turbulence and the small size of the droplets, the ignition can be delayed, that is to say that it is possible, in this case, to reduce the ignition advance. Thus the exhaust gases are at a raised temperature, which increases in as much the temperature of the catalytic system (s)

In other words, it is easier to achieve the required results, meaning that pollution, when the engine is cold, is reduced.

The second phase of the main lift, at maximum lift, permits the introduction of air necessary for combustion. When the lift of low amplitude is short and the fuel flow high, the totality of fuel can not penetrate in the combustion chamber during the low amplitude lift; in this case, the fuel injection continues during the main lift.

FIG. 6 represents the case where the first phase 46 of the lift 40 is in the form of a ramp and the case where the first phase 48 of the main lift 42 is in the form of a threshold. But it is possible to confer any form to the variation of the lift during these first phases.

The invention claimed is:

1. A device for reducing hydrocarbon emissions produced by a cold internal combustion engine comprising:
 a controller operable to electrically control opening of an inlet valve of said internal combustion engine in two successive phases, a first phase primarily for the inlet of fuel and a second phase primarily for the inlet of air; and wherein said controller electrically controls said inlet valve being open substantially lower during said first phase than during said second phase, thereby pulverizing said fuel into fine droplets during said first phase; and
 a catalytic system for combusting burnt exhaust gases.

2. The device of claim 1 wherein said controller is operable to electrically control said inlet valve to open said pilot lift in said two successive phases; and to permit unburnt exhaust gases to enter said internal combustion engine's cylinder through an open exhaust valve at the start of an inlet of fuel during said first phase of a low opening.

3. An engine comprising a device for reducing hydrocarbon emissions produced by a cold internal combustion engine comprising:
 a controller for electrically controlling an inlet valve of said internal combustion engine to open in two successive phases, a first phase primarily for the inlet of fuel and a second phase primarily for the inlet of air; and wherein said controller further electrically controls said inlet valve being open substantially lower during said first phase than during said second phase, thereby pulverizing said fuel into fine droplets during said first phase comprising means for; and
 a catalytic system for combusting burnt exhaust gases.

4. The engine of claim 3 wherein said controller is operable to electrically control: said inlet valve to open twice during an inlet cycle of said internal combustion engine, a first opening of said inlet valve being referred to as a pilot lift and a second opening of said inlet valve being referred to as a main lift; and said inlet valve to open at least one of said pilot lift or main lift in said two successive phases.

5. The device of claim 4 wherein said controller is operable to electrically control said inlet valve to open said pilot lift in said two successive phases; and to permit unburnt exhaust gases to enter said internal combustion engine's cylinder through an open exhaust valve at the start of an inlet of fuel during said first phase of a low opening.

6. A method for reducing hydrocarbon emissions produced by a cold internal combustion engine, comprising the steps of:
 opening an electrically controlled inlet valve of said internal combustion engine in two successive phases, a first phase primarily for the inlet of fuel and a second phase primarily for the inlet of air; and
 opening said inlet valve substantially lower during said first phase than during said second phase, thereby pulverizing said fuel into fine droplets during said first phase.

7. The method of claim 6, further comprising the steps of:
 opening said inlet valve twice during an inlet cycle of said internal combustion engine, a first opening of said inlet valve being referred to as a pilot lift and a second opening of said inlet valve being referred to as a main lift; and
 opening at least one of said pilot lift or main lift in said two successive phases.

8. The method according to claim 7 further comprising the steps of:
 delaying a combustion in said inlet cycle during said main lift, to empty gases which are hotter than said engine; and
 sending said hotter gases to a catalytic combustion system.

9. The method according to claim 7 further comprising the steps of:
 reducing ignition advance by opening said pilot lift in said two successive phases, thereby increasing a turbulence of gas in a cylinder of said engine such that at least a portion of said gas is made hotter than before said opening of said pilot lift;
 delaying a combustion in said inlet cycle during said main lift, to empty said hotter gases; and
 sending said hotter gases to a catalytic combustion system.

10. The method according to claim 7 further comprising the step of lifting said inlet valve during said first phase, either progressively, or at an established value remaining practically constant.

11. The device of claim 10 wherein said controller is operable to electrically control said inlet valve to open twice during an inlet cycle of said internal combustion engine, a first opening of said inlet valve being referred to as a pilot lift and a second opening of said inlet valve being referred to as a main lift; and said inlet valve to open at least one of said pilot lift or main lift in said two successive phases.

12. The method of claim 7, further comprising the step of opening said main lift in said two successive phases, wherein said first phase of a low opening is principally for inlet of fuel.

13. The method of claim 12, further comprising the steps of:

opening said pilot lift in said two successive phases; and permitting unburnt exhaust gases to enter said internal combustion engine's cylinder through an open exhaust valve at the start of an inlet of fuel during said first phase of a low opening.

14. The method of claim 13, further comprising the steps of:

starting said first phase of said pilot phase between 60 DV and 0 DV before a top dead center (TDC) of said inlet;

ending said first phase of said pilot lift between 0 and 30 DV after the TDC of said inlet;

starting said first phase of said main lift between 30 DV and 0 DV after a mid-stroke of a piston; and ending said first phase of said main lift between 0 and 30 DV after said mid-stroke of said piston.

\* \* \* \* \*